US008596323B2

(12) United States Patent
Otten

(10) Patent No.: US 8,596,323 B2
(45) Date of Patent: Dec. 3, 2013

(54) DEVICE AND METHOD FOR ARRANGING DOUBLE-SIDED ADHESIVE FOIL ON A CYLINDRICAL HOLDER FOR A FLEXIBLE PRINTING PLATE

(75) Inventor: Petrus Johannes Marie Otten, Vlissingen (NL)

(73) Assignee: AV Flexologic B.V. (NL)

( * ) Notice: Subject to any disclaimer, the term of this patent is extended or adjusted under 35 U.S.C. 154(b) by 0 days.

(21) Appl. No.: 13/491,780

(22) Filed: Jun. 8, 2012

(65) Prior Publication Data

US 2012/0318429 A1 Dec. 20, 2012

(30) Foreign Application Priority Data

Jun. 14, 2011 (NL) ..................................... 2006931

(51) Int. Cl.
*B29C 65/00* (2006.01)

(52) U.S. Cl.
USPC ............................ 156/446; 156/443; 156/458

(58) Field of Classification Search
USPC ................. 156/443, 446, 447, 453, 468, 470, 156/494–496
See application file for complete search history.

(56) References Cited

U.S. PATENT DOCUMENTS

| | | | | |
|---|---|---|---|---|
| 3,401,073 | A * | 9/1968 | Wood | 156/353 |
| 4,653,369 | A | 3/1987 | Dunsim | |
| 4,925,506 | A | 5/1990 | Baker | |
| 2001/0025575 | A1 | 10/2001 | Kamir et al. | |

FOREIGN PATENT DOCUMENTS

| | | | |
|---|---|---|---|
| DE | 1952543 | U | 12/1966 |
| EP | 0129237 | A1 | 12/1984 |
| EP | 0329228 | A1 | 8/1989 |

OTHER PUBLICATIONS

Search Report received in corresponding Dutch patent No. NL2006931.

* cited by examiner

*Primary Examiner* — Katarzyna Wyrozebski Lee
*Assistant Examiner* — Carson Gross
(74) *Attorney, Agent, or Firm* — Banner & Witcoff, Ltd.

(57) ABSTRACT

The invention relates to a device and a method for arranging double-sided adhesive foil on a cylindrical holder for a flexible printing plate, wherein the device comprises a frame, at least one shaft bearing placed in the frame for bearing-mounting of a shaft connected to the cylindrical holder, and foil roll bearings for a roll of foil, and a support plate with a support surface for the foil, and the projection of the axis between the foil roll bearings onto the support surface extends at an angle differing from 0° relative to the projection of the axis between the shaft bearings onto the support surface. The projection of the foil axis onto the support surface preferably extends transversely of the projection of the axis. The foil is hereby moved in the direction of the axis of the shaft bearings and the foil is fixed in this direction on the cylindrical holder.

9 Claims, 4 Drawing Sheets

DEVICE AND METHOD FOR ARRANGING DOUBLE-SIDED ADHESIVE FOIL ON A CYLINDRICAL HOLDER FOR A FLEXIBLE PRINTING PLATE

RELATED APPLICATIONS

This application claims priority of Dutch application NL 2006931 filed Jun. 14, 2011, hereby incorporated by reference in its entirety.

FIELD OF THE INVENTION

The invention relates to a device for arranging double-sided adhesive foil on a cylindrical holder for a flexible printing plate, comprising a frame, at least one shaft bearing placed in the frame for bearing-mounting of a shaft connected to the cylindrical holder and foil roll bearings placed in the frame for a roll of foil. Such devices are applied in flexo-printing, a letterpress technique wherein printing plates manufactured from flexible material are fixed on a cylindrical holder and the cylindrical holder with flexo-printing plate is placed in a printing press. For the purpose of fixing the flexible printing plates onto the cylindrical holder use is usually made of double-sided adhesive foil arranged on the cylindrical holder. The flexible printing plates are then placed on the double-sided adhesive foil.

BACKGROUND

Such devices are generally known. The double-sided adhesive foil is unwound here from the roll and placed on the cylindrical holder. The cylindrical holder can be formed by an actual printing cylinder, but also by a cylinder jacket-like cover, usually known as a sleeve, placed on a likewise cylindrical holder. In these usual devices the shaft of the foil roll on which the double-sided adhesive foil is wound extends parallel to the shaft of the cylindrical holder.

The space on a business premises where the double-sided adhesive foil is placed on the cylindrical holders is in many cases limited. The cylindrical holder on which the foil is arranged is also poorly accessible because the roll of foil is placed in front of this holder. The object of the invention is to provide such a device which takes up less space.

SUMMARY

This object is achieved with such a device wherein the frame is provided with a substantially horizontally extending support plate with a support surface for the foil, and the projection of the axis between the foil roll bearings onto the support surface extends at an angle differing from 0° relative to the projection of the axis between the shaft bearings onto the support surface.

The foil roll is hereby situated adjacently of the printing cylinder, so that the printing cylinder is more easily accessible.

The invention also relates to a method for arranging double-sided adhesive foil provided on one side with a cover sheet on a cylindrical holder for a flexible printing plate, comprising of bearing-mounting the cylindrical holder, unwinding a strip of foil from a roll of foil in a direction extending at an angle differing from 0° relative to the projection of the axis between the shaft bearings onto the support surface, placing the unwound strip of foil on a support plate, bringing the cylindrical holder into contact with the foil placed on the support plate and further fixing the foil to the cylindrical holder by rotating the cylindrical holder.

According to a first preferred embodiment, the projection of the axis between the foil roll bearings onto the support surface extends perpendicularly relative to the projection of the axis between the shaft bearings onto the support surface. The foil is hereby moved in the direction of the axis of the shaft bearings and the foil is fixed in this direction to the cylindrical carrier. The seam between both side edges of the foil fixed to the cylindrical holder therefore extends parallel to the axis. This is in contrast to the prior art wherein this seam extends tangentially. This embodiment also relates to a method wherein the foil is unwound from the foil roll in the direction parallel to the axis of the cylindrical holder.

According to an alternative embodiment, the projection of the axis between the foil roll bearings onto the support surface extends at an angle between 0° and 90° relative to the projection of the axis between the shaft bearings onto the support surface. The foil extends helically here when it is situated on the cylindrical holder. This embodiment also provides a method wherein the foil is unwound from the foil roll at an angle between 0° and 90° relative to the cylindrical holder.

It is in principle possible to operate the above elucidated device manually. This is however a time-consuming operation which must also be performed accurately. There is therefore a need for such a device which operates as automatically as possible. A preferred embodiment provides for this purpose the measure that the device comprises a manipulator for gripping the foil at the roll of foil, transporting the gripped foil in the direction of the axis between the shaft bearings along the path between the shaft bearings while the foil unrolls from the roll, and for placing the unrolled foil onto the supports. Steps of the process of arranging the self-adhesive foil onto the cylindrical holder can be performed independently using this measure, whereby the speed and accuracy are greatly increased. It is noted here that these measures can in principle also be applied in configurations wherein the axis between the foil roll bearings extends parallel to the axis between the shaft bearings. It will be apparent that the manipulator must be able to move in the axial direction of the cylindrical holder. There are numerous options for a construction allowing such a movement. An attractive configuration results when the frame is provided with two rails which each extend on a side of the axis between the shaft bearings and the supports and along which the manipulator is movable. It is hereby possible to have the manipulator move in the manner of a gantry crane.

The foil adhering on both sides is generally supplied connecting to a roll. It must be severed before it is fixed to the cylindrical holder. A further embodiment provides for this purpose the measure that the device comprises a cutting element connected to the frame for severing the foil between the roll of foil and the unrolled foil between the shaft bearings. Although other constructions are not precluded, the cutting element is preferably provided with a cutting beam connected to the frame, a knife movable and drivable in the longitudinal direction of the cutting beam and a drive element for the knife, wherein the cutting element is movable along the rails.

The cutting element is preferably adapted to sever the foil in the direction transversely of the direction of the axis between the shaft bearings. Depending on the angle at which the unrolled foil strip extends to the axis of the cylindrical holder, the foil is thus always severed parallel to the edges of the cylindrical holder so that there is no loss of material.

According to a first structural embodiment, the at least one shaft bearing is placed under the support surface, the support surface is provided with a recess for the cylindrical holder and the device comprises a pressing roller connected to the frame, extending above the at least one shaft bearing and movable at least in vertical direction for the purpose of pressing the foil onto the cylindrical holder. The foil is hereby placed initially on the support surface, wherein the cover sheet of the foil is located on the upper side of the foil and the adhesive side of the foil is located on the underside, so that it adheres to the cylindrical holder approaching the foil from its underside. The support surface here preferably comprises on its upper side a layer of poorly adhesive material. The pressing roller is preferably also mounted in a sub-frame which is connected to an auxiliary frame for movement in horizontal direction transversely of the direction of the axis. This embodiment likewise provides a method wherein the foil is placed with its cover sheet upward on the support plate and the cylindrical holder is brought into contact with the foil from below.

An alternative structural embodiment provides the measure that the support surface has a closed surface, that the at least one shaft bearing is placed above the support surface and that the shaft bearing is movable at least in vertical direction. The foil is placed here on the support plate with its cover sheet downward. This embodiment likewise provides a method wherein the foil is placed on the support plate with its cover sheet downward and the cylindrical holder is brought into contact with the foil from above.

The above elucidated measures make it possible to perform mechanically the measures previously carried out by hand. The operative here initiates the various operations of the device. It is however recommended that the device is provided with a control member for controlling at least one of the following components: the gripping member of the manipulator, the drive of the manipulator, the drive of the knife, the drive of the cutting element in the direction of the axis between the shaft bearings, the vertical drive of the pressing roller, the horizontal movement of the pressing roller and the movement of the shaft bearings. This measure enables full automation, so that considerably less personnel is required for the use of the device.

Particularly when the width of the strip of the double-sided adhesive foil is smaller than the circumference of the cylindrical holder, and so more than one strip of the foil has to be arranged on the cylindrical holder, positioning of the foil is of the greatest importance in order to avoid seams and overlapping pieces of foil. Automation of the control of the diverse components determining the positioning of the double-sided adhesive foil already allows for greater accuracy. In order to further improve the positioning accuracy, according to a further preferred embodiment the device is provided with a visual detection member for detecting the cylindrical holder and the control member is adapted to control the drive of the holder, the manipulator and the pressing roller subject to the signal supplied by the visual detection member to the control device. Using this measure the position of the initially arranged foil part can be precisely determined and the position of the foil part to be subsequently arranged can be better adjusted to the position of the foil part or foil parts already present. Use is otherwise made here of the fact that the double-sided adhesive foil is provided with a cover sheet which is preferably coloured. The position of the double-sided adhesive foil can hereby be readily detected by the visual detection member. The cover sheet is after all only removed shortly before arranging of the flexible printing plates, i.e. only after the cylindrical holder has been removed from the device according to the invention. Although the use of photocells is not precluded, it is recommended because of the greater accuracy that the visual detection member be formed by a camera.

In order to increase production speed it is attractive that the shaft bearings are both received in a carrier provided with more than one shaft bearing, that the carriers are movable simultaneously between a loading and unloading position, in which the shaft bearings are accessible, and an active position in which the shaft bearings are situated in a position between the supports. It hereby becomes possible to save the time which is required in the case of a single carrier to exchange the carrier; while the double-sided adhesive foil is being arranged on the cylindrical holder, a following cylindrical holder can already be placed in a loading position of the carrier, and the cylindrical holder already provided with foil can be removed.

Although other configurations are not precluded, it is recommended that the carriers are disc-shaped and, together with a shaft connecting the carriers, form a carousel.

It is possible to embody the device as a stand-alone apparatus. This embodiment is particularly suitable for arranging double-sided adhesive foil on cylindrical holders of different dimensions which are later used in different printing presses.

According to an alternative, the device forms part of a positioning device for placing flexible printing plates on the cylindrical holder, and the positioning device is adapted to position the printing plates on the upper side of the supports and the cylindrical holder for the printing plates. A far-reaching degree of integration is hereby obtained, all the more so as diverse parts of the present invention for arranging the double-sided adhesive foil are already present in the mounting device for printing plates, such as the bearings for supporting the cylindrical holders for the printing plates, the supports in the form of the mounting table and, in the case of an automatic mounting device, the control device.

The double-sided adhesive foil has a certain thickness. It is important for the quality of the printed material obtained with the combination of flexible printing plate and holder that the double-sided adhesive foil is arranged seamlessly and without overlap on the cylindrical holder. This is particularly, though not exclusively, the case for double-sided adhesive foils provided with a foam layer, whereby the thickness thereof is considerable. In order to provide the option of placing the self-adhesive foil seamlessly and without overlap on the cylindrical holder, a specific embodiment provides a combination of a device of the above stated type, a cylindrical holder for a flexible printing plate and a roll of double-sided adhesive foil, wherein the circumference of the cylindrical holder is equal to a whole number of times the width of the roll of foil. Because the axis of the roll of foil extends perpendicularly of the axis of the cylindrical holder, the width direction of the foil extends in transverse direction of the axis of the cylindrical holder. When the foil is being arranged on the cylindrical holder, this width therefore determines the extent to which the cylindrical holder is covered with the foil in tangential direction. A complete covering of the cylindrical holder in the tangential direction is obtained when the above relation is applied. In the case of a relation according to a multiple, the multiple of axially extending strips of foil must be placed abutting but not overlapping each other on the cylindrical holder.

It is however also possible for a single strip of foil to be sufficient to cover the cylindrical holder. The circumference of the cylindrical holder is then equal to the width of the roll of foil.

When however the foil strip is placed helically on the cylindrical holder, it is recommended that the circumference of the cylindrical holder is equal to a whole number of times the quotient of the width of the roll of foil and the sine of the angle between the projection of the axis between the foil roll bearings onto the support surface and the projection of the axis between the shaft bearings onto the support surface in order to arrive at a seamless covering of the surface of the cylindrical holder.

BRIEF DESCRIPTION OF THE DRAWINGS

The present invention will be elucidated hereinbelow with reference to the accompanying drawings, in which.

DETAILED DESCRIPTION

Figure 1:
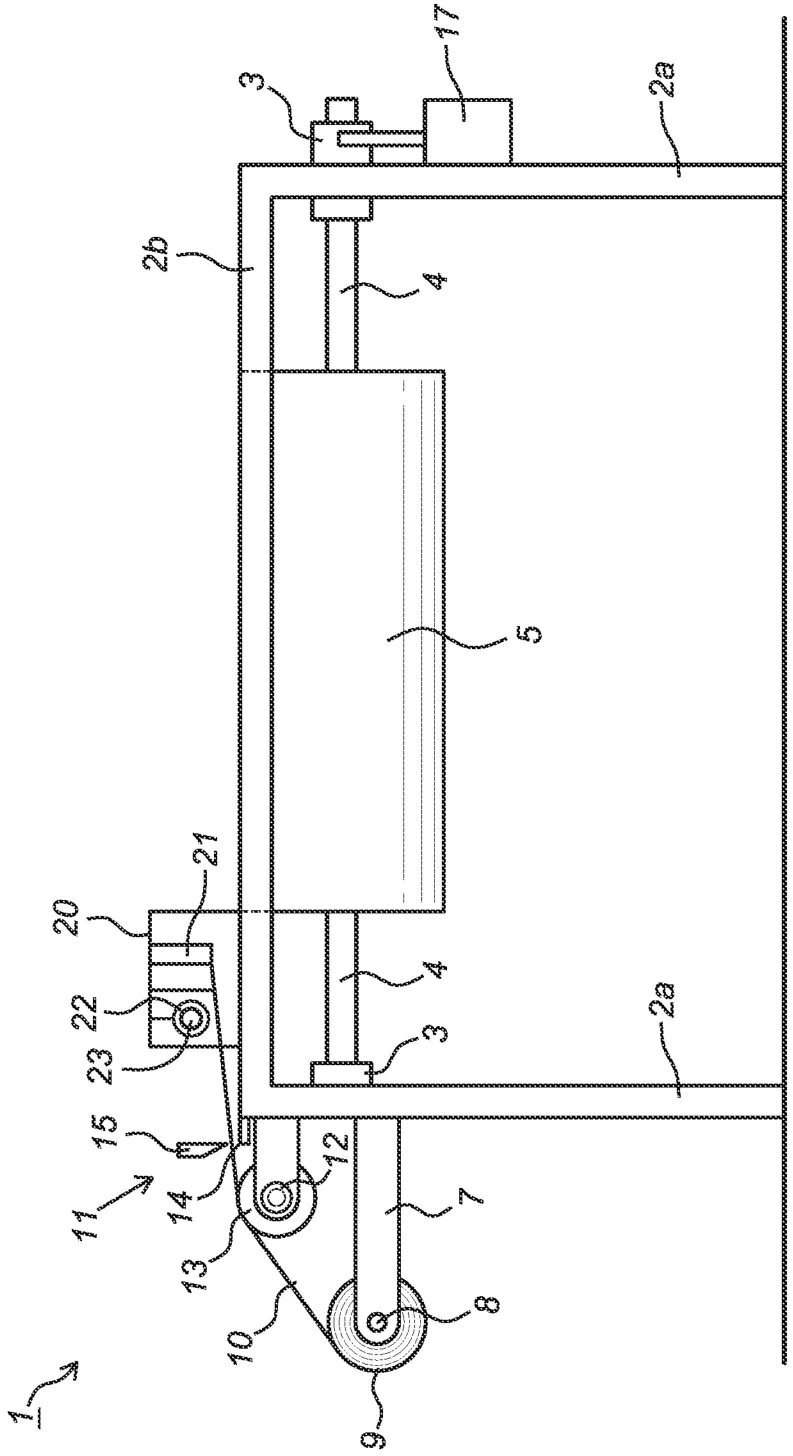
FIG. 1 is a schematic cross-sectional view of a device according to the invention.
Figure 2:
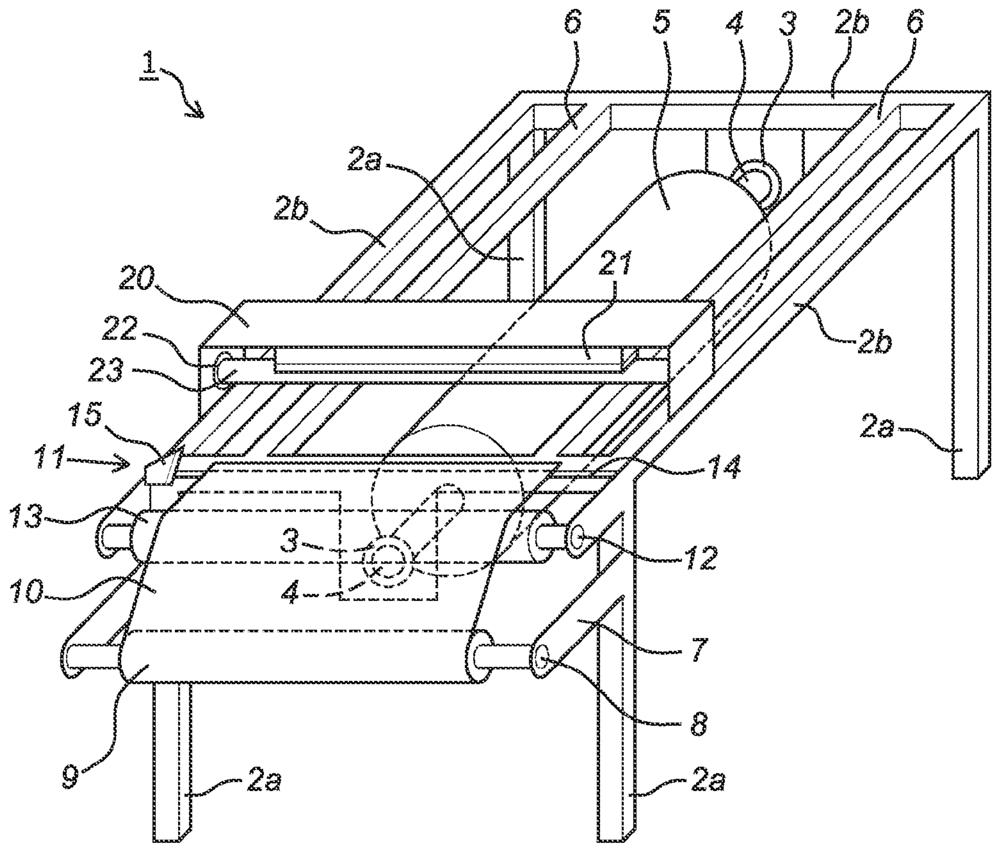
FIG. 2 is a schematic perspective view of the device shown in FIG. 1.

Shown in FIGS. 1 and 2 is a device designated in its entirety with 1 for arranging double-sided adhesive foil on a cylindrical holder. This device 1 comprises a rectangular frame 2 manufactured from for instance steel profiles and provided with four legs 2*a* connected on their upper side by four horizontally extending connecting profiles 2*b*. Arranged between the pairs of legs 2*a* on either side of the short side of the frame are bearings 3 for bearing-mounting of a shaft 4 of a cylindrical holder 5. This cylindrical holder 5 can be formed by a printing cylinder, but also by a sleeve fixed on a carrier cylinder. Bearings 3 are preferably mounted here in frame 2 such that the height of shaft 4 is adjustable. It is hereby possible to have the highest edge of cylindrical holder 5 coincide with the highest level of frame 2. An electric motor 17 is also arranged in the frame for driving the cylindrical holder 5 in rotation.

In the present exemplary embodiment a support 6 is arranged on either side of each of the bearings 3. Supports 6 each comprise a strip of metal provided on its upper side with a layer of adhesion-repellent material such as silicone. This prevents the adhesive layer on the underside of the foil adhering to supports 6. Both supports 6 are mounted movably along the short profiles 2*b* of frame 2 to enable the supports to function with foil of differing widths. Use is preferably made for this purpose of an electric motor, not shown in the drawings. It is otherwise also possible, particularly when the bearings are arranged non-centrally in the short sides of frame 2, for only a single support 6 to be present.

Arranged on one of the short sides of the frame by means of supports 7 is a shaft 8 which is adapted to carry a roll 9 of double-sided adhesive foil 10. It is otherwise possible to make use of a number of supports on which rolls of foil of different width can be arranged to enable cylindrical holders of differing diameter to be provided with foil. This foil 10 is provided on its upper side with a cover sheet, not shown in the drawings, as is usual with foils of this type. Also arranged on this same side of the frame is a cutting device 11 on which two bearings 12 are once again mounted for a guide roller 13. Guide roller 13 is also provided with a layer of non-adhesive material. Cutting device 11 comprises a plate 14 over which the foil is guided and over which a knife 15 forming part of the cutting device is movable by means of a guide and electric motor not shown in the drawing.

A portal 20 is movable along the long horizontal profiles 2*b* of frame 2. Arranged in the portal is a manipulator 21 which is adapted to grip and release foil 10. Owing to the mobility of portal 20 a free end of foil 10 can be gripped and, through the movement of the portal, be moved to a position above the cylindrical holder 5 and supports 7.

Finally, the device comprises a control member, not shown in the drawing, in the form of a personal computer.

The portal is also provided with a pressing roll 23 which is mounted in bearings 22 and the axis of which extends parallel to the short side of frame 2. Using pressing roll 23, which is movable together with its bearings 22 in vertical direction inside portal 20, it is possible to press the foil 10 onto cylindrical holder 5. Pressing roll 23 is preferably at least as long as cylindrical holder 5 or at least as long as the length of the piece of severed foil in order to enable placing of the whole piece of foil onto the cylindrical holder in a single rotation.

The operation of the device is as follows: an empty cylindrical holder 5 is placed on bearings 3. Portal 20 is then moved to a position above cutting device 11. Here the manipulator 21 grips the loose end of foil 10 and then pulls the foil 10 to a position above cylindrical holder 5. When the correct length has been pulled past the cutting device 11, cutting device 11 is activated for the purpose of severing foil 10. The resulting severed piece of foil 10 is then moved above cylindrical holder 5 and placed onto cylindrical holder 5 by a downward movement of manipulator 21. Manipulator 21 then releases the foil. The foil will then rest on cylindrical holder 5 and one or both supports 6. Manipulator 21 is then removed and pressing roller 23 is brought into contact with cylindrical holder 5 and cylindrical holder 5 is driven in rotation by means of electric motor 17. Foil 10 is placed here without folds or irregularities onto cylindrical holder 5. Once foil 10 has been pressed in its entirety onto cylindrical holder 5, pressing roller 23 is moved upward again. The cylindrical holder 5 provided with foil 10 can then be removed.

It will be apparent that the above operations can be performed automatically by means of the control member.

Figure 3:
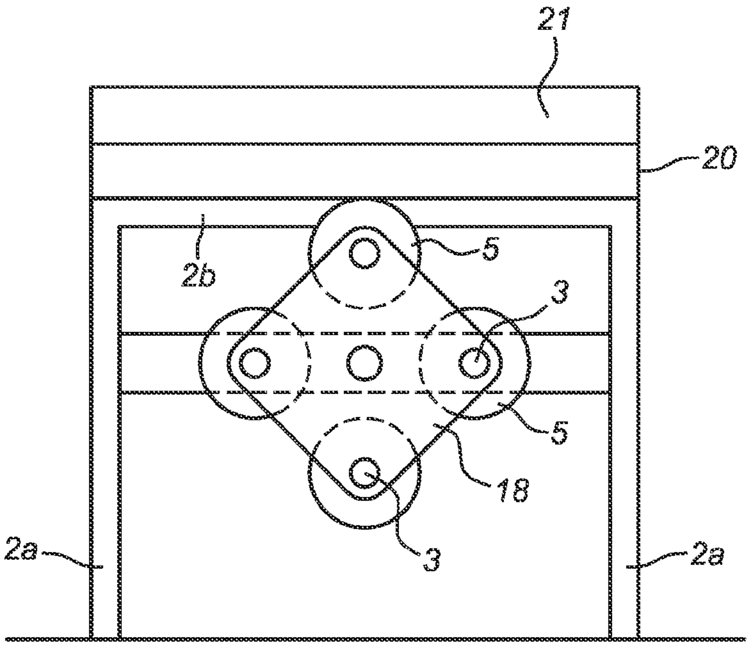
FIG. 3 is a schematic cross-sectional view of a detail of an alternative embodiment.

The above elucidated exemplary embodiment relates to a piece of foil 10 with a width equal to the circumference of cylindrical holder 5. It is however also possible, for instance in the case of cylindrical holders 5 with a large circumference, that two pieces of foil have to be placed adjacently of each other in axial direction onto the cylindrical holder. This placing of the pieces of foil then takes place successively in accordance with the above described operations. It is particularly important in this situation that the second piece of foil is positioned fitting precisely to the piece of foil placed first. While it is in principle possible to perform this operation under the control of the control member, it is recommended here to make use of an optical device for detecting the position of the already arranged piece of foil, preferably a camera. Such a camera is preferably also arranged in portal 20. The position of the piece of foil 10 already arranged can be readily detected in that this foil is coloured or provided with a coloured cover sheet. The above elucidated device is a single device, i.e. a device with a single pair of bearings 3 for carrying a single cylindrical holder 5. FIG. 3 shows an embodiment provided with four pairs of bearings 3. Each of these bearings 3 is placed in one of two carriers 18, which are in turn mounted rotatably in frame 2. Both carriers 18 are placed on the same shaft so that they rotate synchronously when driven by an electric motor 19 not shown in the drawing. Through synchronous rotation of the two carriers 18 the cylindrical holders 5 placed in bearings 3 can be carried successively into the upper position in which they can be provided with foil 10.

It is also noted that the above elucidated embodiments are embodied as stand-alone devices. It is however also possible to combine the device with a positioning device for automatic placing of flexible printing plates on the cylindrical holder.

Various modifications to the device will then be necessary, particularly in respect of the manipulator. This will after all have to be adapted to manipulate both the foil and the flexible printing plates. The presence of separate manipulators for the foil and for the printing plates is not precluded. A certain modification of the supports may also be necessary because they will also have to function as mounting table. When a camera is applied for the purpose of positioning the printing plates, it can also be used for accurate placing of the severed pieces of foil.

Figure 4:
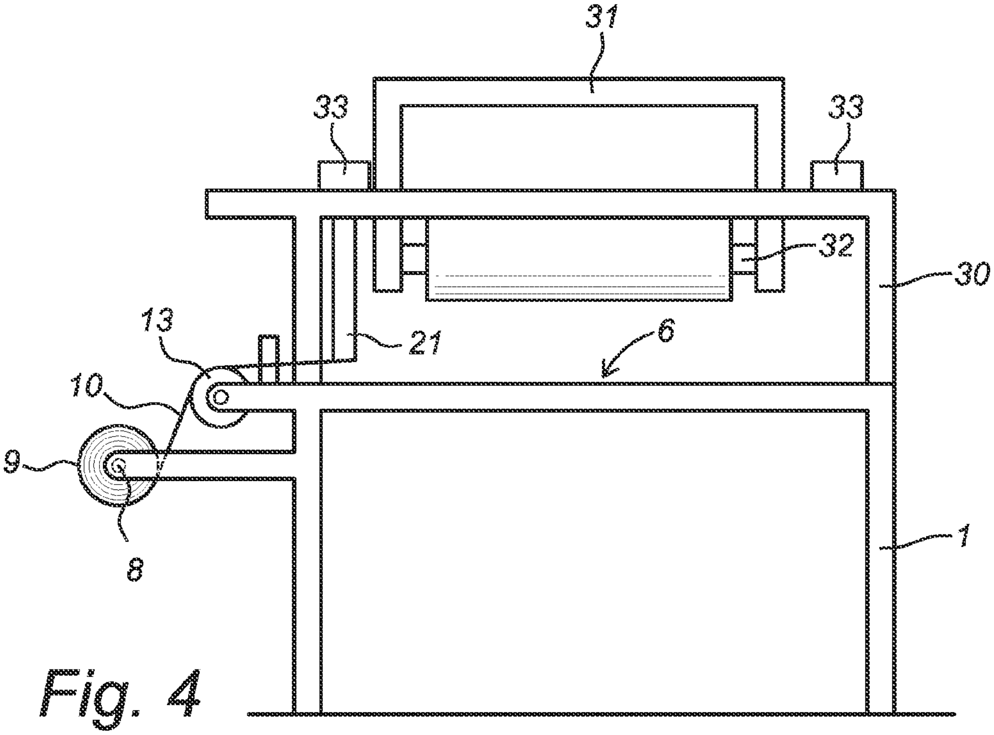
FIG. 4 is a schematic cross-sectional view of alternative embodiment.

The embodiment shown in FIG. 4 differs from the embodiments described in the foregoing in the measure that cylindrical holder 5 approaches the supports 6 from above. This has the result that the double-sided adhesive foil has to be placed with its cover sheet downward on the support so that it can adhere to the cylindrical holder.

The embodiment of FIG. 4 comprises a frame 1 and—in contrast to the above described embodiment—an auxiliary frame 30 placed fixedly on the frame and likewise having a rectangular structure. Placed in auxiliary frame 30 is a sub-frame 31 which is movable in vertical direction relative to auxiliary frame 31. Mounted in this sub-frame 31 is a horizontally extending shaft 32 which is adapted to receive a cylindrical holder 5 on which the double-sided adhesive foil 10 must be arranged. As in the first embodiment, the frame is also provided with a shaft 8 for a roll 9 of double-sided adhesive foil 10. As in the foregoing embodiment, the foil is guided via a guide roller 13 to cutting device 11. The roll of foil 10 is however placed such that the foil with its cover sheet is guided downward to support 6. Because the cylindrical holder approaches support 6 from above, support 6 is formed by a closed plate or sheet. The device further comprises a manipulator 21 mounted movably on auxiliary frame 30. Cameras 33 are also arranged on auxiliary frame 30 for detecting the position of foil 10 and cylindrical holder 5 on support 6 for positioning purposes. As in the foregoing embodiment, the camera is connected for this purpose to the control device.

The operation of this embodiment corresponds to that according to the foregoing embodiment, with the proviso that the foil is placed on the support with its cover sheet downward and the cylindrical holder approaches the foil from above.

Figure 5:
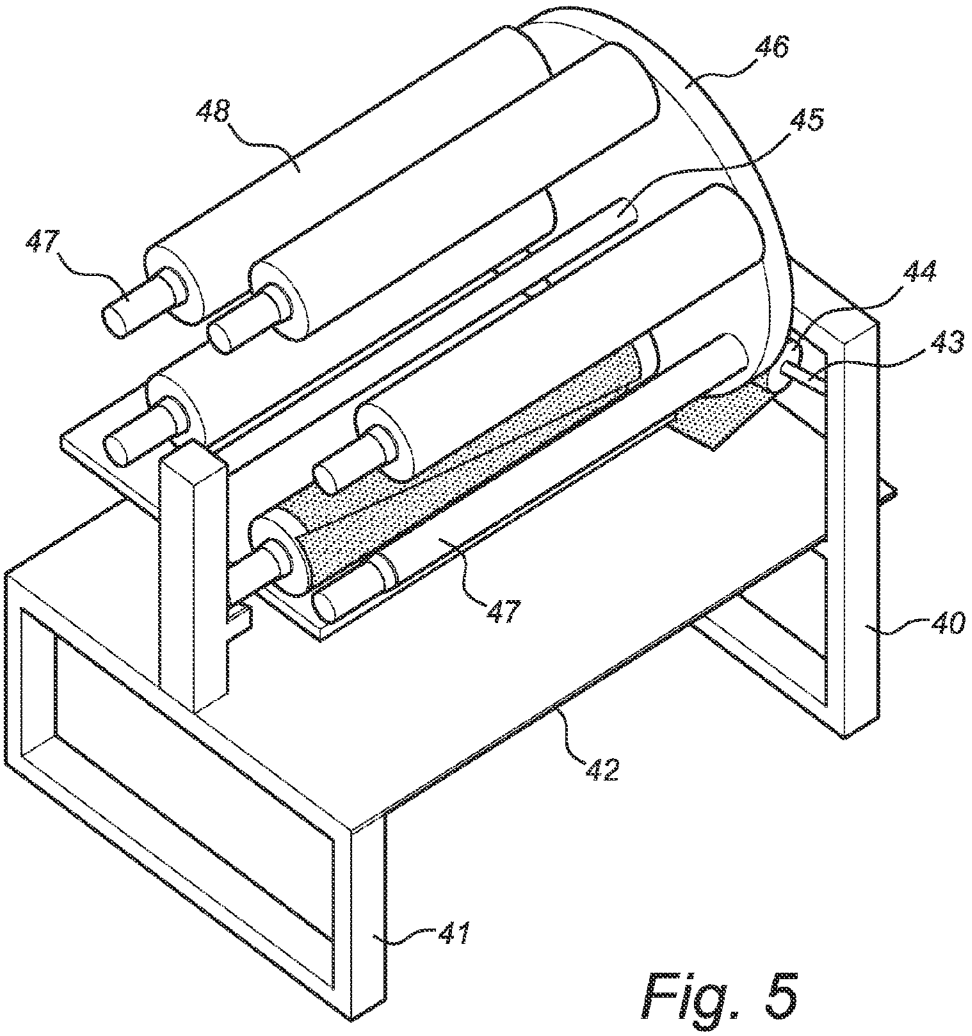
FIG. 5 is a schematic perspective view of a variant of the embodiment shown in FIG. 4.

The embodiment shown in FIG. 5 differs from the embodiment shown in FIG. 4 in the fact that only a single bearing is present per shaft. Placing and removal of the cylindrical holders is greatly simplified by this measure. Some structural changes are also made.

The device shown in FIG. 5 comprises two supporting frame parts 40, 41 which are connected by a horizontally extending support plate 42. One of the frame parts bears a shaft 43 for carrying a roll 44 of double-sided adhesive foil. Shaft 43 extends obliquely. Frame parts 40, 41 are also connected to a shaft 45. A disc 46 is mounted rotatably on shaft 45 and shafts 47 are placed at equal angles in disc 46. The device comprises an electric motor, not shown in the drawing, for driving in rotation the disc 46 and the shafts 47 placed thereon. Because shafts 47 are each bearing-mounted on only one side, placing and removal of cylindrical holders 48 is greatly simplified. The operation of this device corresponds to that of the device shown in FIG. 4. It will be apparent that the device according to FIG. 5 is provided with a number of parts which are not shown in the drawing.

In the embodiment shown in FIG. 4 the longitudinal direction of the foil extends parallel to the direction of the axis of the cylindrical holder. It is however also possible for the strip of foil to extend at an angle between 90° and 0°. The foil is here wound helically onto the cylindrical holder. The cylindrical holder must for this purpose be rotated about a vertical axis in order to obtain the oblique position relative to the foil strip. The cylindrical holder must also be displaceable in axial direction on its shaft to enable helical placing of the foil strips adjacently of each other.

It will be apparent that the measures shown in the above embodiments can be combined with measures from other embodiments, and that within the scope of the claims other embodiments fall within the scope of protection.

I claim:

1. Device for arranging double-sided adhesive foil on a cylindrical holder for a flexible printing plate, comprising:

a frame;

at least one shaft bearing placed in the frame for bearing-mounting in an axial direction a shaft connected to the cylindrical holder; and foil roll bearings placed in the frame for a roll of foil, the frame being provided with a substantially horizontally extending support plate with a support surface for the foil, wherein a projection of an axis between the foil roll bearings onto the support surface extends at an angle between 0° and 90° relative to a projection of an axis extending from the at least one shaft bearing onto the support surface;

wherein the device comprises a manipulator for gripping the foil at the roll of foil, transporting the gripped foil in the direction of the axis extending from the at least one shaft bearing along a path extending from the at least one shaft bearing while the foil unrolls from the roll, and placing unrolled foil onto the support plate; and wherein the device comprises a cutting element connected to the frame for severing the foil between the roll of foil and the unrolled foil, the cutting element adapted to sever the foil in the direction substantially transversely of the axial direction.

2. Device as claimed in claim 1, characterized in that the at least one shaft bearing is placed under the support surface, that the support surface is provided with a recess for the cylindrical holder and that the device comprises a pressing roller connected to the frame, extending above the at least one shaft bearing and movable at least in a vertical direction for the purpose of pressing the foil onto the cylindrical holder.

3. Device as claimed in claim 1, characterized in that the support surface has a closed surface, that the at least one shaft bearing is placed above the support surface and that the at least one shaft bearing is movable in a vertical direction.

4. Device as claimed in claim 1, characterized in that the device is provided with a control member for controlling at least one of the following components: a gripping member of the manipulator, a drive of the manipulator, a drive of a knife, a drive of the cutting element in the axial direction, a vertical drive of a pressing roller, a horizontal movement of a pressing roller and a movement of carriers of the at least one shaft bearing.

5. Device as claimed in claim 4, characterized in that the device is provided with a visual detection member for detecting the cylindrical holder and that the control member is adapted to control the drive of the manipulator and the pressing roller subject to a signal supplied by the visual detection member to the control device.

6. Device as claimed in claim 1, characterized in that the at least one shaft bearing is received in a carrier provided with more than one shaft bearing, that the carrier is movable between a loading and unloading position, in which the at least one shaft bearing is accessible, and an active position in which the at least one shaft bearing is situated in a position between supports and that the carriers are circular and, together with a shaft connecting the carriers, form a carousel.

7. Device as claimed in claim 1, characterized in that the device is embodied as a stand-alone apparatus.

8. Device as claimed in claim 1, characterized in that the device forms part of a positioning device for placing flexible printing plates on the cylindrical holder, and that the positioning device is also adapted to position the printing plates on an upper side of supports and the cylindrical holder for the printing plates.

9. Combination of a device as claimed in claim 1, a cylindrical holder for a flexible printing plate and a roll of double-sided adhesive foil, characterized in that the circumference of the cylindrical holder is equal to a whole number of times the quotient of the width of the roll of foil and the sine of the angle between the projection of the axis between the foil roll bearings onto the support surface and the projection of the axis extending from the at least one shaft bearing onto the support surface.

* * * * *